United States Patent
Arini

(10) Patent No.: US 10,142,382 B1
(45) Date of Patent: Nov. 27, 2018

(54) DETECTING VIDEO STREAMING AND IDENTIFYING STREAMED VIDEOS

(71) Applicant: Google LLC, Mountain View, CA (US)

(72) Inventor: Nick Salvatore Arini, Southampton (GB)

(73) Assignee: GOOGLE LLC, Mountain View, CA (US)

( * ) Notice: Subject to any disclaimer, the term of this patent is extended or adjusted under 35 U.S.C. 154(b) by 604 days.

(21) Appl. No.: 13/843,751

(22) Filed: Mar. 15, 2013

(51) Int. Cl.
*G06F 15/16* (2006.01)
*H04L 29/06* (2006.01)

(52) U.S. Cl.
CPC ............ *H04L 65/60* (2013.01); *H04L 65/607* (2013.01)

(58) Field of Classification Search
CPC . H04L 65/00; H04L 65/1003; H04L 65/1006; H04L 65/1009; H04L 65/1013; H04L 65/1016; H04L 65/60; H04L 65/607; H04L 65/608
See application file for complete search history.

(56) References Cited

U.S. PATENT DOCUMENTS

| | | | |
|---|---|---|---|
| 7,802,277 B2 * | 9/2010 | Medford | H04N 21/23476 380/200 |
| 8,055,899 B2 | 11/2011 | Levy et al. | |
| 8,060,399 B2 | 11/2011 | Ullah et al. | |
| 8,180,920 B2 | 5/2012 | Mills et al. | |
| 2003/0018709 A1 * | 1/2003 | Schrempp | H04N 7/16 709/203 |
| 2003/0033321 A1 * | 2/2003 | Schrempp | H04H 20/14 |
| 2005/0025316 A1 * | 2/2005 | Pelly | H04N 5/913 380/277 |
| 2006/0193474 A1 * | 8/2006 | Fransdonk | H04L 9/0825 380/279 |
| 2006/0200259 A1 | 9/2006 | Hoffberg et al. | |
| 2008/0060035 A1 | 3/2008 | Tsang et al. | |
| 2010/0037265 A1 * | 2/2010 | Amir | H04L 27/18 725/54 |
| 2010/0253781 A1 * | 10/2010 | Sasson | B64D 45/0015 348/148 |
| 2011/0138022 A1 * | 6/2011 | Xie | H04L 65/1083 709/219 |
| 2011/0197246 A1 | 8/2011 | Stancato et al. | |
| 2013/0103827 A1 * | 4/2013 | Dunlap | H04L 47/2441 709/224 |
| 2013/0259228 A1 * | 10/2013 | Ren | H04L 9/3247 380/200 |

(Continued)

*Primary Examiner* — Dhairya A Patel
(74) *Attorney, Agent, or Firm* — Foley & Lardner LLP

(57) ABSTRACT

A method for identifying a video streamed from a server to a client, includes receiving at a processor of an intermediary between the server and client, a video data packet; determining if the video data packet comprises a separated identification of the streamed video; when the video data packet comprises a separated identification, determining if the separated identification is readable to identify the streamed video; when the separated identification is readable to identify the streamed video, identifying the streamed video; and when the separated identification is not readable to identify the streamed video, performing content analysis of the video data packet, comprising: creating a fingerprint of data extracted from the video data packet, and comparing the fingerprint to reference fingerprints to determine a match.

16 Claims, 6 Drawing Sheets

(56) References Cited

U.S. PATENT DOCUMENTS

2014/0157298 A1* 6/2014 Murphy ........... H04N 21/64322
                                                      725/14
2014/0259056 A1* 9/2014 Grusd ................ H04N 21/8583
                                                      725/34

* cited by examiner

DETECTING VIDEO STREAMING AND IDENTIFYING STREAMED VIDEOS

BACKGROUND

Program providers supply content to viewers over various communications networks. Such content may include videos streamed, for example, over the Internet and received at a browser. Content also may include broadcast video (i.e., television). Content may be accessed using a browser or a television receiver. Content also may be accessed using an application on a mobile device. Other content and other content distribution methods are possible.

Program providers and sponsors may be interested in knowing what content segments are accessed or viewed (i.e., "viewing history"). In the context of television viewing, a determination of viewing history is manageable. However, in the context of video streamed over the Internet, identifying which videos are being viewed, or that have been viewed, and associated metrics data such as number of views, is becoming increasingly difficult to the point of being unmanageable because of the very large and ever-growing video libraries available on the Internet. As these video libraries increase in size, traditional metering solutions become intractable.

Furthermore, proliferation of the number and types of media devices capable of accessing and displaying streaming videos has compounded the problems inherent in traditional metering since one aspect of metering involves installing a meter on each media device.

Finally, streaming video systems may use encryption to prevent unwanted or unauthorized access to videos. One such encryption system is a public key encryption system, widely used to add security to, for example, data packets, including video data packets transmitted over the Internet between a server and a client. Current meters, which are intermediary between the server and client, are not able to decrypt the data packets, making identity of the videos difficult or impossible.

SUMMARY

A method for identifying a video streamed from a server to a client, includes receiving at a processor of an intermediary between the server and client, a video data packet; determining if the video data packet comprises a separated identification of the streamed video; when the video data packet comprises a separated identification, determining if the separated identification is readable to identify the streamed video; when the separated identification is readable to identify the streamed video, identifying the streamed video; and when the separated identification is not readable to identify the streamed video, performing content analysis of the video data packet, comprising: creating a fingerprint of data extracted from the video data packet, and comparing the fingerprint to reference fingerprints to determine a match.

A system for measuring data contained in an encrypted data packet includes a router in a communications path between a media device and a video provider. The media device receives the encrypted data packet and the router includes a computer readable storage medium encoded with a program of instructions executable by a processor of the router for decrypting the encrypted data packet and logging data from the decrypted data packet. When the instructions are executed, the processor issues a certificate with a private key of the media device, applies the private key to the encrypted data packet to decrypt the encrypted data packet request, and provides the decrypted data packet to a meter of the router to log data from the decrypted data packet.

A processor-implemented method for detecting streaming video and identifying a streamed video sent to a client from a server, includes receiving, at a processor, video data packets; examining, at the processor, accessible data of the video data packets to detect streaming and to identify the streamed video; when the streamed video is identified from the accessible data, sending, by the processor, a streamed video identification to a third-party server; when the video is not identified from the accessible data: executing content recognition processing of the unencrypted video data, and processing the accessible video data to identify the streamed video.

DESCRIPTION OF THE DRAWINGS

The detailed description refers to the following Figures in which like numerals refer to like items, and in which.

DETAILED DESCRIPTION

Figure 1:
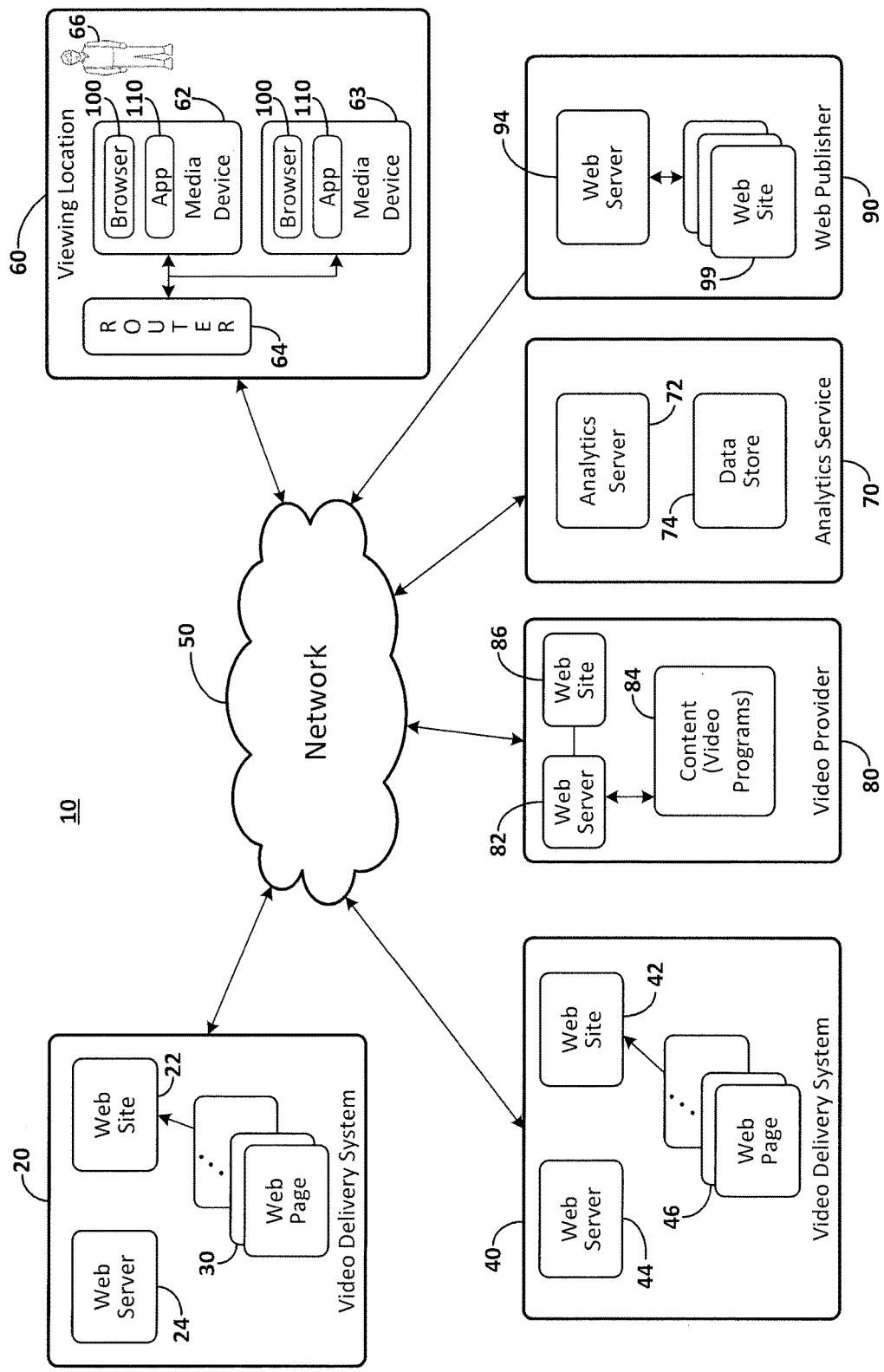
FIG. 1 illustrates an example environment in which detection of video streaming and identification of streamed videos is enabled at or by using a router.

Video program providers and sponsors who may provide sponsored content for display with videos may have an interest in which videos are watched, and even more, which population segments watched the videos. One aspect of determining viewing history involves sampling a large population and making inferences about the viewing history based on the sample results. One way to sample a viewing population is through the use of individual panelists (viewers in the sample population) and metering devices that record and report on the individual panelists' viewing history. For example, an individual panelist (i.e., a viewer) may agree to installation of a meter at the panelist's residence. The meter may record the individual panelist's television viewing and Internet activity, and reports the data to a remote server. In this regard, note that the panelists agree to being measured. Furthermore, individual panelists would agree to sign in to measurement, but any measurement may be suspended at any time (incognito) by a panelist. Also note that this approach works in a household having more than one viewer. For example, each household member may be recruited as a panelist. Alternately, a subset of the household members may participate as panelists.

In contrast to metering individual panelists, viewing history data may be collected by a single metering device installed at a household. For example, a television set top box (STB) may record television viewing data. This approach cannot distinguish viewing by individual household members, but may be less costly to implement.

An analytics service may invoke metering by installing a meter at a gateway or router at the media entry point of a physical viewing location such as a home. In one aspect, the meter is placed in homes of recruited panelists with their permission. The meter logs unsecured traffic from all the Internet clients (e.g., a laptop or desktop computer, an Internet-enabled television, a tablet, a game box, and a smartphone in the home). This centralized, or gateway-based approach to Internet metering of in-home usage has advantages over alternatives such as individual client metering installations in that complex and intrusive software is not required on all clients that are required to be metered, and the meter may kept up-to-date when browsers and operating systems are updated. Once installed, such a router or gateway-based meter may be non-intrusive and comprehensive, which may lead to more accurate and complete data collection, and fewer and less significant support issues with correspondingly less churn (and hence cost) in the panel.

Metering techniques include audio and/or video fingerprinting to determine the content of a video currently playing. Fingerprinting involves taking an audio or visual (or both) sample of the playing video, creating a fingerprint from the sample, and then comparing the fingerprint to fingerprints in a reference library. In some cases, the playing video includes, as metadata, a unique identification that may be used to identify the video, and the fingerprinting process may not be needed.

In the realm of broadcast television, one fingerprinting process for determining the identity of a program displayed on a television involves recording audio samples emanating from the television, time-stamping the audio samples, providing the time-stamped audio samples to an reference site, and, at the reference site, creating audio fingerprints from the audio samples and comparing the audio fingerprints to a reference library containing corresponding reference audio fingerprints. The audio samples may be collected using an audio meter built into the television, a STB, or another media device such as a tablet. The reference library may be created and essentially updated continuously by recording audio from every television program (or most such programs) on every channel, playing during a given time period such as, for example, a week. The reference audio fingerprints need not be retained for an extensive time because any measurement and comparison analysis between the sample fingerprints and the reference fingerprints may be performed in temporal proximity to the original broadcast of the program from which the reference and sample audio fingerprints are derived. Even when time-shifted television viewing is considered, the retention requirements of the reference audio samples may be short, on the order of a week.

Streaming video also may be identified by fingerprint-based analysis, although some aspect of this analysis in the online realm differ from those in the broadcast television realm. In cases where fingerprinting may be helpful, allowable, and feasible to identify a video, the audio/video samples may be obtained at or near the media device playing the video. However, current gateway-based metering may not be effective in identifying a streamed video. In addition, current encryption practices may complicate the process of trying to identify a streamed video.

To overcome problems in current systems and processes related to metering of streaming videos, disclosed herein are systems and methods for detecting streaming video and for identifying a steamed video. The systems and methods involve intermediary metering (i.e., between client and server) of streaming video. When encrypted videos are streamed, the systems and methods may invoke a decryption process at the intermediary point.

Video streaming detection, as an aspect of the systems and methods, may involve an intermediary that reads an outgoing request from the client and determines, based on the requested URL, that any response will involve streaming video. Alternately, the intermediary may read a header for data packets passing through the intermediary and determine the packets are modules of a video to be streamed at the client.

In one aspect, a video may be identified by a known (and unique) video ID (embedded, for example, in a video request or a URL of the video watch page), which may be read by the intermediary and used to identify the streamed video. In this aspect, the video ID may not be encrypted, and so, the herein disclosed decryption processes may not be required.

In another aspect, the video does not have a unique ID, or has a unique ID that is not readable by the intermediary, but the video is not encrypted. In this aspect, the video may be identified by analyzing the video content by, for example, audio and/or video fingerprinting.

In yet another aspect, the video is encrypted and a unique ID is not available. In this aspect, the video may require decryption if the video is to be identified through content analysis.

One embodiment of the encryption process involves supplying the intermediary with a private key of the client, decrypting the video data packets, assessing their content, and providing the assessed content to a video identification system.

In still another aspect, the videos may be identified by a known unique ID, which may be read by the intermediary and used to identify the video streamed. However, the video is encrypted, and decryption and analysis of the video's content may be desired.

Considering these aspects, the herein disclosed systems and methods may be used to detect, at an intermediary such as a router, video streaming and identify streamed videos, including when the streamed videos are encrypted.

As noted above, with current router-based metering, the inability of a router to capture secured Internet (e.g., HTTPS-protocol) traffic results from the fact that public key encryption is established between the client (e.g., a browser on a computer) receiving HTTPS-secured traffic and a server delivering encrypted streaming videos. Establishing this encryption may prevent unauthorized eavesdropping on the communications between the client and the remote server by any entity in the client-server path. One such entity in this path is a router, and associated router meter, used to collect media consumption data from panelists. Without a private key of the client, the router (and any other entity on the server-client path (ISP switches for example)) cannot read or otherwise make sense of the encrypted traffic. Thus, while encryption serves a useful function, encryption also prevents gateway-based metering of content delivered over the Internet.

In the above-described scenario of a router meter used to collect panelist traffic, a panelist, by appropriate manipulation of a client (e.g., changing a browser configuration file), may give the router "permission" to "view" encrypted traffic. To accommodate this process, also disclosed herein are systems and methods that allow the router to decrypt the traffic at the router. Such decryption may be completed "off-line", and the encrypted traffic is passed through the router to the client without affecting the normal request delivery process. To achieve this decryption at the router, the herein disclosed systems and methods enable the client to share its private keys securely with the router. In an embodiment, such sharing of private keys is accomplished by establishing a public key link between the client and the router and sending the client's private key over the link. The client then may delegate authority to the router to decrypt certain types of content (but not necessarily all) for logging purposes without affecting the actual client request (because the logging is done out of band).

To delegate such decryption authority to the router, the herein disclosed systems and methods may establish a local certificate authority. The thus-created certificate authority then may generate certificates "on-the-fly" whenever metering of encrypted traffic is desired. In an embodiment, a system and method that generates certificates on-the-fly combines the functions of a proxy server (e.g., a squid proxy server) with a dynamic secured socket layer (SSL) certificate generation feature. In this embodiment, each client behind the in-home router would explicitly "trust" the proxy server to be the certificate authority. In an aspect, the proxy server is established at a remote server, such as an analytics system server.

In an alternate embodiment, the router is established as a certificate authority, and may generate keys for all local clients on the router rather than having the certificates generated on the clients. Once the router has access to the private keys of a client, the router may decrypt the traffic.

FIG. 1 illustrates an example environment in which detection of video streaming and identification of streamed videos are enabled. In FIG. 1, environment 10 includes video delivery systems 20 and 40, viewing location 60, analytics service 70, video provider 80, and Web site publisher 90, all of which communicate over network 50. Although FIG. 1 shows these entities as separate and apart, at least some of the entities may be combined or related. For example, the video delivery system 20 and analytics service 70 may be part of a single entity. Other combinations of entities are possible.

The video delivery system 20 operates Web site 22. The Web site 22 is hosted on Web server 24. The Web site 22 includes Web pages 30. The Web site 22 may include Internet search features that allow Web site visitor 66 to search for videos and other content displayed by the Web server 24 on the Web pages 30. The Web pages 30 may display search results, namely content segments such as videos, as well as video advertisements, static advertisements, and other information. The Web server 24 may provide links to enable navigation among the Web pages 30. The Web site 22 may display videos created/and or supplied by Web site visitor 66, video provider 80, and other third-party video suppliers.

The Web pages 30 may display search results in response to a search query submitted by Web site visitor 66. For example, a Web page 30 may display several videos that satisfy a search query. Each such video may be assigned a unique identification (ID) by the video delivery system 20.

The video delivery system 40 operates in a manner similar to that of the video delivery system 20. However, note that the systems 20 and 40 may not share video identification information. That is, each system may generate a unique ID for each video it provides, but the systems may make those IDs available only within their own systems.

The network 50 may be any communications network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the video delivery system 20 and a media device at the viewing location 60 across a wire line or a wireless link. While illustrated as a single or continuous network, the network 50 may be divided logically into various sub-nets or virtual networks, so long as at least a portion of the network 50 may facilitate communications among the entities of FIG. 1.

The viewing location 60 may be the residence of an individual, such as Web site visitor 66, who operates media devices 62 and 63 to access, through router 64, resources such as the Web sites 22. The viewing location 60 may be a mobile location that changes with time as, for example, when the Web site visitor 66 changes his location. The media devices 62 and 63 may be fixed or mobile. For example, media device 62 may be an Internet connected "smart" television (iTV); a "basic" or "smart" television connected to a set top box (STB) or other Internet-enabled device; a Blu-Ray™ player; a game box; and a radio, for example. Media device 63 may be a tablet, a smartphone, a lap top computer, or a desk top computer, for example. The media devices 62 and 63 may include browsers, such as browsers 100. The browser 100 may be a software application for retrieving, presenting, and traversing resources such as at the Web site 22. A resource may be identified by a Uniform Resource Locator (URL) and may be a Web page, image, video, or other content. The URL may allow the browser 100 to connect to the Web site 22. Hyperlinks present in resources enable the Web site visitor 66 to navigate the browser 100 to related resources. The Web site visitor 66 may operate the browser 100 to search for Web sites related to specific topics or to search for a specific Web site by URL. The media devices 62 and 63 also may include applications 110. The Web site visitor 66 may cause the media devices 62 or 63 to execute an application 110, such as a mobile banking application, to access online banking services. The application 110 may involve use of a browser or other means, including cellular means, to connect to the online banking services. Other applications may include game applications. Once connected to the Web site 22, the media devices 62 and 63 may allow viewing of content such as videos and static images generated by entities such as the video provider 80 and displayed on the Web pages 30 at the Web site 22. For example, the media devices may have installed thereon a video player (see FIG. 2) that uses a video playback protocol matched to that of the video delivery systems 20 or 40. Video players may be supplied by the video delivery systems 20 and 40 when the systems deliver a video to the media devices. The video players may be retained in the browsers 100.

The Web site visitor 66 may access the Web site publisher 90 to use a social networking Web site, a blog Web site, including a personal blog Web site and/or a commercial blog Web site, and other Web sites.

The analytics service 70 includes analytics server 72. The analytics service 70 may operate in conjunction with Web site operators to collect, analyze, and report information and data related to visits to Web sites and viewing of video advertisements by Web site visitors 66. The analytics service 70 may be part of the video delivery system 20, or the video delivery system 40, or may be a separate entity. The analytics service 70 collects, analyzes, stores (in data store 74), and reports on data and information related to visits to the Web site 22, operation of applications, and other reported activity. In an aspect, the analytics service has access to the unique video ID for videos supplied by the system 20 but not by the system 40.

In an embodiment, given the potentially large number of videos, search engines, and Web pages, the analytics service 70, and particularly the analytics server 72 and its associated data sore 74 may be replicated such that the analytics service 70 includes hundreds or thousands of such server-data store combinations in a distributed architecture that makes the analytics service 70 responsive to a very large number of video search requests per unit time.

The video provider 80 provides content, in the form of videos 84, which may be displayed on the Web pages 30 and viewed and/or heard by the Web site visitor 66 using the media devices 62 and 63. In an embodiment, the video provider operates, using Web server 82, video sharing Web site 86, and may embed the videos 84 on the Web site 86. However, the video provider 80 may simply create and provide videos, such as polar bear videos, for display by other entities such as the video delivery system 20 or at a Web site operated by Web site publisher 90. The video provider 80 may be a company, a movie or television studio, or an individual. Videos 84 provided to the system 20 may be given a unique video ID by the system 20.

The Web site publisher 90 operates Web sites 99 using Web server 94. The Web sites 99 may include those on which Web site visitors 66 may provide comments, upload videos, and upload images. The Web sites 99 may include social networking Web sites. The Web site publisher 90 may operate a Web hosting service, and the Web sites 99 may be personalized for and used by individuals, such as the Web site visitors 66.

Figure 2A:
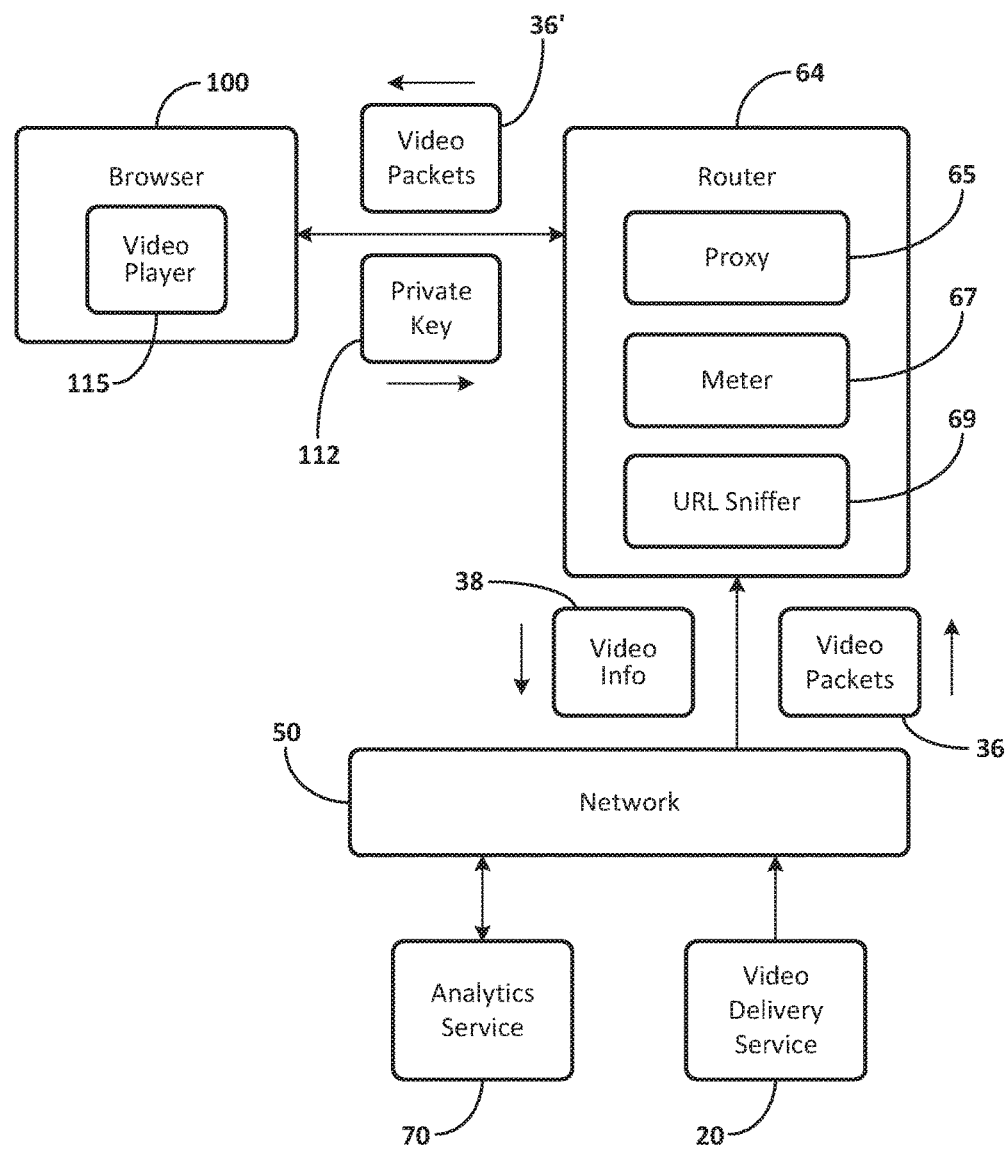
FIGS. 2A and 2B illustrate example components that may operate in the environment of FIG. 1 to support detection of video streaming and identification of streamed videos.

FIG. 2A illustrates example components that may operate in the environment of FIG. 1 to support detection of video streaming and identification of streamed videos. In FIG. 2A, browser 100 connects to router 64 which in turn connects through network 50 to analytics service 70 and video delivery system 20.

In FIG. 2A, browser 100 sends requests (not shown) for streaming videos. The requests may begin when the browser 100 accesses a video search Web page. The Web site visitor 66 then operates the browser to selected a desired video, and the browser 100 sends a request (not shown) with the URL of the associated video watch page. In reply, the video delivery system 20 sends video data packets 36 to the browser 100. The video data packets 36 typically would be displayable only by a video player compatible with the streamed video's file format.

The browser 100 includes video player 115. The video delivery system 20 may provide the video player 115. The video player 115 uses a protocol or file format matched to that of the videos streamed from the service 20.

The video player 115 decodes and displays data contained in video data packets 36, and may decode the data a little faster than playing the data. The decoded but not yet played data are retained in a buffer (not shown) in case there are some delays in streaming the video data packets 36. After playing a video data packet 36, the video player 115 may discard the data, and a full copy of the streamed video never exists on the media device and thus cannot be saved on the media device. Instead, replays of the streamed video require another request-delivery cycle over the network 50.

The router 64, in an embodiment, includes proxy 65, meter 67, and URL sniffer 69. Together, these components may represent a program update or plug-in to the router 64. The program may be stored in a (non-transitory) computer-readable storage medium (not shown) of the router 64, and may be executed by a processing component (also not shown) of the router 64. Alternately, the components may be embodied in a firmware change to the router 64. In an embodiment, when decryption of a video data packet at the router 64 is to occur, the browser, as the client in a client-server relationship, may send a certificate authorization with a private key 112 to the proxy 65. This allows the video data packet 36 to be decrypted at the router 64. The decrypted data packet 36' then is passed to the browser 100 where it is played and then discarded. In the router 64, the decrypted video data packet 36' may be subjected to analysis such as fingerprinting, as described below. The thus-created fingerprints may be sent to the analytics service 70 as video information 38.

In another embodiment, the URL sniffer 69, where possible, detects the outgoing video request, which may contain a URL of the video watch page. However, some video delivery systems may attempt to hide the URL from any intermediaries between the client and server. When the URL may be read, the meter 67 may use this information to identify the source of the video (e.g., the video watch page), and use the source in identifying the video.

The meter 67, or another component of the router 64, accessing either video data packets 36' decrypted in the router 64, or an unencrypted video data packet 36 (in reality, all video data packets may be accessed; the data extracted from the video data packets are inspected and reconstructed into a representation of the original video stream), may create video and/or an audio fingerprints of all or a portion of the streamed video. The fingerprints then may be sent to the analytics service 70 for purposes of determining the content and identity of the streamed video.

Figure 2B:
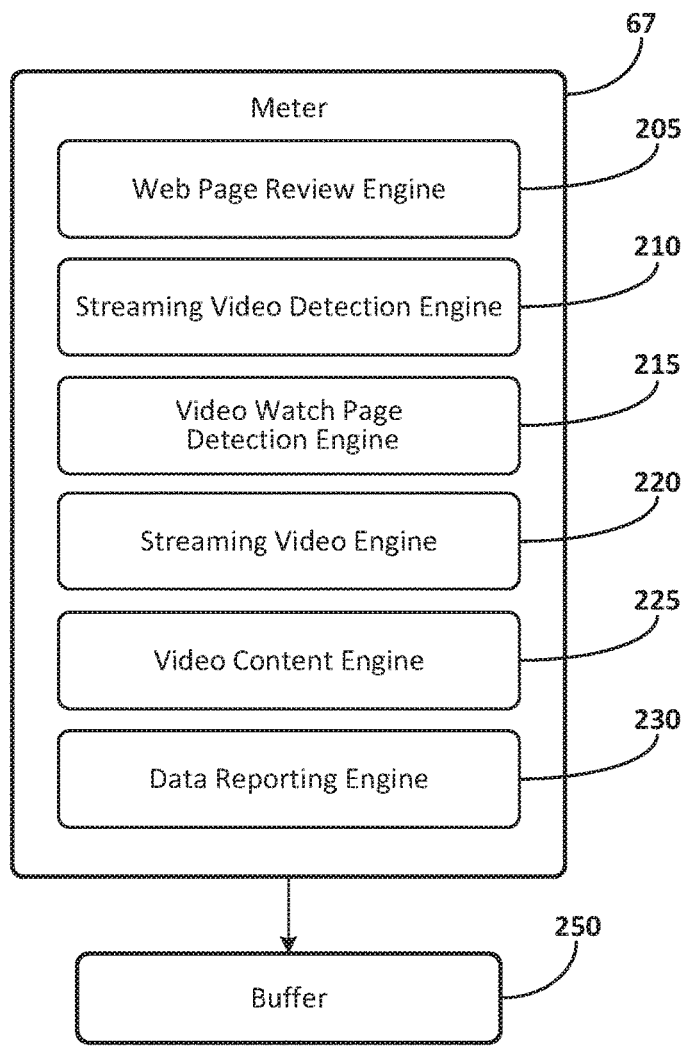

FIG. 2B illustrates an example of meter 67 that may identify streamed videos. The meter 67 is shown incorporated into the router 64 (see FIG. 2A).

In FIG. 2B, meter 67 includes Web page review engine 205, streaming video detection engine 210, video watch page detection engine 215, streamed video engine 220, video content engine 225, and data reporting engine 230. The meter 67 may store video content data in buffer 250. The buffer 250 may be part of the meter 67 or may be external to the meter 67.

Web page review engine 205 reviews all Web pages passing through the router 64 to one of the media devices. Since the viewing location 60 shows two media devices 62 and 63, the meter 67 tracks which media device is displaying which Web page (e.g., in its browser 100).

Streaming video detection engine 210 determines when a passing Web page contains or is linked to a streamed video. For example, the engine 210 may determine the Web page URL conforms to a known streaming video Web page. The engine 210 may receive the URL from URL sniffer 69.

Video watch page detection engine 215 determines when a currently displayed Web page is a video watch page. For example, the engine 215 may detect reception of the URL of a video watch page. This URL also may be received from the URL sniffer 69.

Streamed video play engine 220 detects reception of video data packets 36.

Video content engine 225 extracts information for the video data packets 36 (after decryption if required), reconstructs the streamed video, and creates video fingerprints. Alternately, or in addition, the engine 225 may create audio fingerprints. Note that in some instances, the meter 67 may acquire information from any detected URLs to sufficiently identify the streamed video. In an aspect, the engine 225 still may create video and/or audio fingerprints. The engine 225 may store the fingerprints in buffer 250.

As an alternative to creating fingerprints, the engine 225 may cause all or part of one or more video data packets to be compressed and stored in the buffer 250. At some time subsequent to such buffering, the compressed video data packets may be sent to the analytics service 70, where the fingerprints are created and subsequently subjected to comparison analysis against known audio and/or video fingerprints.

Reporting engine 230 periodically reports the buffered data to the analytics service 70.

Figure 3A:
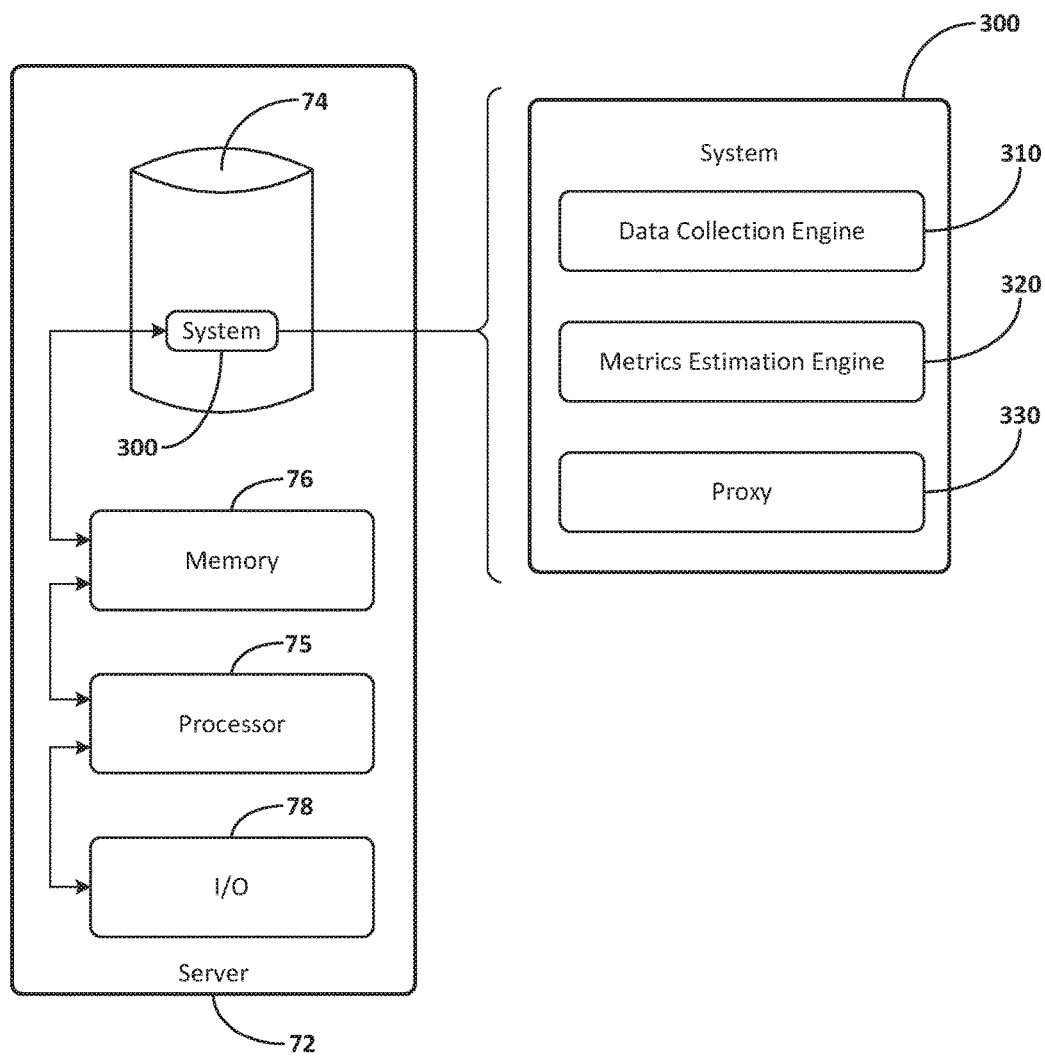
FIGS. 3A and 3B illustrate an example analytics service that may operate in conjunction with the router and other components of FIGS. 2A and 2B to detect video streaming and identify streamed videos.

FIG. 3A illustrates example analytics system 300 that receives data from the meter 67 of FIG. 2B. FIG. 3A also illustrates select components of the analytics service 70 as implemented on server 72.

FIG. 3A shows the system 300 stored in non-transitory computer-readable storage medium 74, processor 75, memory 76, and input/output (I/O) 77. The processor 75 loads the system into memory 76 and executes the instructions contained in the system 300. The I/O 77 allows other machines and systems to communicate with the processor 75.

In FIG. 3A, system 300 includes data collection engine 310, metrics estimation engine 320, and proxy 330. The data collection engine 310 and estimation engine 320 process data received at the analytics service 70 to produce estimates of media consumption for a large population from which a panel (including panelist/viewer) is recruited. The data collection engine 310 also may perform audio and/or video fingerprint analysis to identify a streamed video. The analysis involves comparison of the audio and/or video fingerprints drawn from the streamed video to fingerprint samples of known videos that are held in a reference video data library. The reference video data library may be static or (frequently) updated.

The proxy 330 acts as a trusted certificate authority for the router 64—that is, the proxy is trusted by the media devices 62 and 63 (as well as other registered media devices of the viewer 66 and registered media devices of other panelists.

In operation, when the router 64 detects secure (HTTPS) traffic for one of the media devices 62 or 63, the router 64 notifies the service 70 (the notification going to the proxy 330). The proxy 330 then issues a certificate with the private key of the media device. The certificate and private key allow the system 300 or the router 64 to decrypt the encrypted traffic and process its information off-line (e.g., log the information directly with the system 300) while the router 64 sends the originally-encrypted traffic, unaffected, to the media device.

Figure 3B:
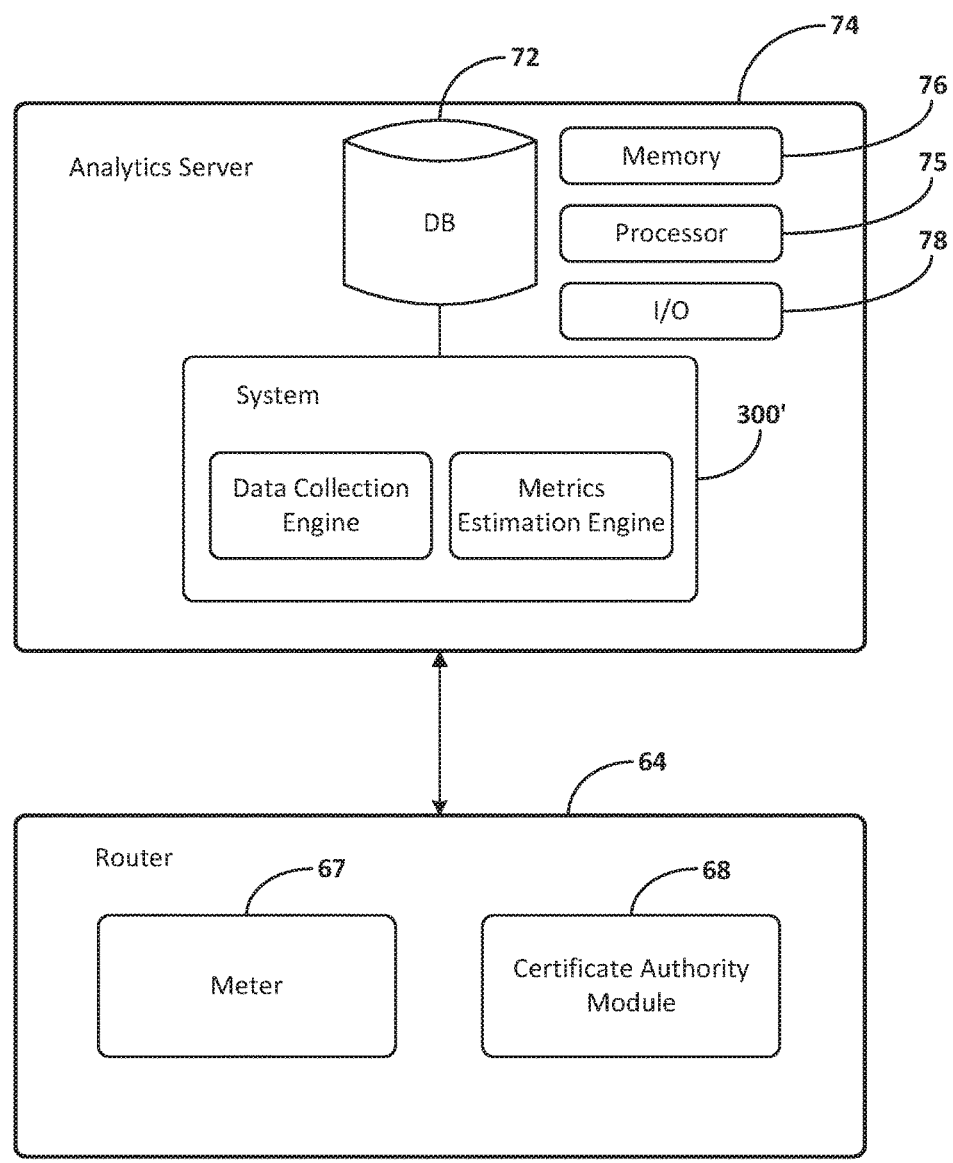

FIG. 3B illustrates an alternate system that enables a router to decrypt encrypted Internet traffic sent between a client and a server. The functions of the components of FIG. 3B are similar in many respects to those of FIG. 3A. However, system 300' does not issue certificates with private keys. Instead, that function is entrusted to certificate authority module 68 installed on router 64. The router 64 decrypts and the meter 67 logs the data.

Subsequently, the router 64 may report the logged data to the system 300'. However, in reporting the logged data, the router 64 encrypts the logged data (with a different key from that used to decrypt the traffic) before transmission to the analytics service 70.

Figure 4:
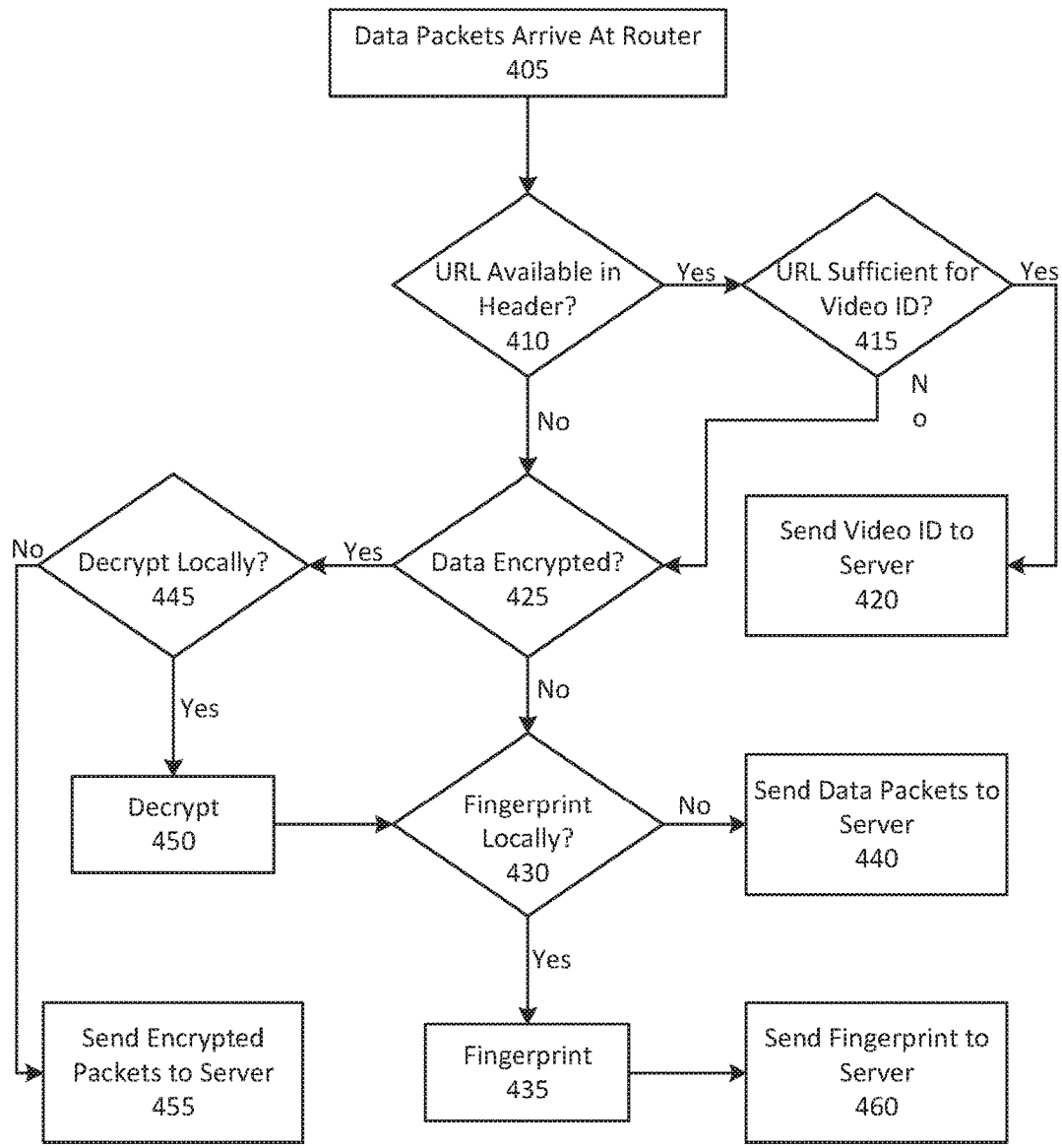
FIG. 4 is a flowchart showing a method for detecting video streaming and identifying streamed videos.

FIG. 4 is a flowchart illustrating example method 400 for detecting video streaming and identifying streamed videos. Method 400 begins in block 405 when data packets 36 arrive at router 64. Router 64 may examine header data to determine that the received data packets are for streaming video.

In block 410, the router 64 determines if a URL is available in the header or elsewhere in the data packet, or can be detected by a URL sniffing process. If a URL is available, the method moves to block 415 and the router 64 determines if the URL is sufficient to identify the streamed video. If the URL is sufficient, the method 400 moves to block 420, and the router 64 sends the streamed video identification to a remote server, such as the analytics server 72.

In block 410, if the URL is not available, the method 400 moves to block 425. In block 425, the URL examines the data packets 36 to determine if the data are encrypted. If the data are not encrypted, the method 400 moves to block 430 and the router 64 executes decision logic to determine if fingerprinting is to be conducted locally at the router 64. If local fingerprinting is chosen, the method 400 moves to block 435 and local fingerprinting is executed. Then, in block 460, the fingerprints are sent to analytics server 460. In block 430, if local fingerprinting is not chosen, method 400 moves to block 440, and the router forwards copies of the data packets to the analytics server 72 for fingerprint generation and subsequent analysis.

In block 425, if the data are encrypted, the method 400 moves to block 445 and the router 64 executes decision logic to decrypt the data locally or not. If the data are to be decrypted locally, the method 700 moves to block 450 and the data packets are decrypted. Following block 450, method 400 moves to block 430.

In block 445, if decryption is not to be local, method 400 moves to block 455 and the encrypted data packets are sent to analytics server 72.

Following blocks 420, 440, 455, and 460, method 400 ends.

Certain of the devices shown in the herein described figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions. The disclosed devices, components, and systems contemplate using or implementing any suitable technique for performing the steps illustrated. Thus, any flowcharts are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

I claim:

1. A processor-implemented method for identifying streamed video, comprising:
   receiving, at a router, a request for content from a client device;
   transmitting, by the router, the request to a content server;
   receiving, at the router, a first set of streamed video data packets sent by the content server in response to the request, each of the first set of streamed video data packets comprising encrypted video data for a first streamed video and an unencrypted header;
   transmitting, by the router, the first set of streamed video data packets to the client device;
   examining, by the router, the unencrypted header for information identifying the first streamed video;
   determining, by the router, that the first streamed video is not identifiable from the unencrypted header;
   responsive to determining that the first streamed video is not identifiable from the unencrypted header:
     decrypting, by the router, the encrypted video data to create decrypted video data,
     processing, by the router, the decrypted video data to identify the first streamed video, and
   transmitting, by the router, a first identification of the first streamed video to an analytics server;
   receiving, by the router, a second set of streamed video data packets, each of the second set of streamed video data packets comprising encrypted video data for a second streamed video and an unencrypted header;
   examining, by the router, the unencrypted header of each of the second set of streamed video data packets for information identifying the second streamed video;
   determining, by the processor, that the second streamed video is identifiable from the unencrypted headers of the second set of streamed video data packets; and
   transmitting, by the router, a second identification of the second streamed video to the analytics server.

2. The method of claim 1, wherein the request comprises a uniform resource locator (URL) related to the first streamed video.

3. The method of claim 2, further comprising:
   extracting, by a URL sniffer of the router, the URL from the request;
   determining, by the router, that the URL is unreadable; and
   identifying, responsive to the determination that the URL is unreadable, that the URL is not sufficient to identify the first streamed video.

4. The method of claim 1, further comprising creating, by the router, a fingerprint of the decrypted video data.

5. The method of claim 4, further comprising comparing the fingerprint to reference fingerprints to determine a match.

6. The method of claim 5, wherein comparing the fingerprint to reference fingerprints to determine a match further comprises transmitting the fingerprint to the analytics server, the analytics server comparing the fingerprint to the reference fingerprints.

7. The method of claim 1, further comprising:
   establishing, by the router, a public key link between the router and the client device; and
   receiving, over the public key link, a private key of the client device for decryption of the encrypted video data.

8. The method of claim 1, further comprising:
   establishing, by the router, a local certificate authority;
   transmitting, by the router, an encryption key to the client device;
   receiving, by the router, the first set of streamed video data packets sent by the content server, the content server encrypting the first set of streamed video data packets using a copy of the encryption key received from the client device; and
   decrypting, by the router, the encrypted video data using the encryption key.

9. A router configured to identify streamed video, comprising:
an input device configured to receive data transmitted between a server and a client device; and
a processor that, upon execution of a program of instructions stored in a memory:
receives a request for content from a client device;
transmits the request to a content server;
receives a first set of streamed video data packets sent by the content server in response to the request, each of the first set of streamed video data packets comprising encrypted video data for a first streamed video and an unencrypted header;
transmits the first set of streamed video data packets to the client device;
examines the unencrypted header for information identifying the first streamed video,
determines that the first streamed video is not identifiable from the unencrypted header;
responsive to determining that the first streamed video is not identifiable from the unencrypted header:
decrypts the encrypted video data to create decrypted video data,
processes the decrypted video data to identify the first streamed video, and
transmits a first identification of the first streamed video to an analytics server;
receives a second set of streamed video data packets, each of the second set of streamed video data packets comprising encrypted video data for a second streamed video and a second unencrypted header;
examines the second unencrypted header for information identifying the second streamed video;
determines, by the processor, that the second streamed video is identifiable from the second unencrypted header; and
transmits, by the router, a second identification of the second streamed video to the analytics server.

10. The router of claim 9, wherein the processor reconstructs the first streamed video from the decrypted video data.

11. The router of claim 9, wherein the processor generates a fingerprint from the decrypted video data.

12. The router of claim 11, wherein the processor compares the fingerprint to reference fingerprints.

13. The router of claim 11, wherein the processor transmits the fingerprint to the analytics server for comparison to reference fingerprints, the analytics server comparing the fingerprint to reference fingerprints.

14. The router of claim 9, wherein the processor:
establishes a public key link between the router and the client device; and
receives, over the public key link, a private key of the client device for decrypting the encrypted video data.

15. The router of claim 9, further comprising a uniform resource locator (URL) sniffer configured to extract a URL from the request, and wherein the processor:
determines that the URL is unreadable; and
identifies, responsive to the determination that the URL is unreadable, that the URL is not sufficient to identify the first streamed video.

16. The router of claim 9, wherein the processor:
establishes a local certificate authority;
transmits an encryption key to the client device;
receives the first set of streamed video data packets sent by the content server, the content server encrypting the first set of streamed video data packets using a copy of the encryption key received from the client device; and
decrypts the encrypted video data using the encryption key.

* * * * *